US012463224B2

(12) United States Patent
Zhao et al.

(10) Patent No.: US 12,463,224 B2
(45) Date of Patent: Nov. 4, 2025

(54) ANODE CATALYST LAYER WITH HIGH REVERSAL TOLERANT CAPABILITY FOR MEMBRANE ELECTRODE ASSEMBLIES AND FUEL CELLS

(71) Applicant: SINOHYKEY TECHNOLOGY GUANGZHOU CO. LTD, Guangdong (CN)

(72) Inventors: Mingquan Zhao, Guangdong (CN); Shanyun Mo, Guangdong (CN); Jiaqiang Zhong, Guangdong (CN); Yunsong Yang, Guangdong (CN); Siyu Ye, Guangdong (CN); Yuquan Zou, Guangdong (CN); Junke Tang, Guangdong (CN); Ning Sun, Guangdong (CN)

(73) Assignee: SINOHYKEY TECHNOLOGY GUANGZHOU CO. LTD., Guangdong (CN)

( * ) Notice: Subject to any disclaimer, the term of this patent is extended or adjusted under 35 U.S.C. 154(b) by 669 days.

(21) Appl. No.: 17/738,365

(22) Filed: May 6, 2022

(65) Prior Publication Data
US 2022/0359885 A1 Nov. 10, 2022

Related U.S. Application Data

(63) Continuation of application No. PCT/CN2021/099554, filed on Jun. 11, 2021.

(30) Foreign Application Priority Data
May 10, 2021 (CN) .......................... 202110506098.8

(51) Int. Cl.
*H01M 4/86* (2006.01)
*H01M 4/88* (2006.01)
*H01M 8/1004* (2016.01)

(52) U.S. Cl.
CPC ....... *H01M 4/8663* (2013.01); *H01M 4/8828* (2013.01); *H01M 8/1004* (2013.01); *H01M 2004/8684* (2013.01)

(58) Field of Classification Search
CPC .......................... H01M 4/8663; H01M 8/1004
(Continued)

(56) References Cited

U.S. PATENT DOCUMENTS

2010/0062305 A1* 3/2010 Kadotani ............ H01M 4/8828
429/481
2010/0159298 A1* 6/2010 Haug .................... H01M 4/881
429/483

(Continued)

FOREIGN PATENT DOCUMENTS

CN 101702439 A 5/2010
CN 101794895 A 8/2010
(Continued)

OTHER PUBLICATIONS

KR 20190036809 A machine translation (Year: 2019).*
(Continued)

*Primary Examiner* — Jonathan G Leong
*Assistant Examiner* — John S Medley
(74) *Attorney, Agent, or Firm* — Muncy, Geissler, Olds & Lowe, P.C.

(57) ABSTRACT

An anode catalyst layer with high reversal tolerant capability includes an anode inner catalyst layer close to a proton exchange membrane and an anode outer catalyst layer close to a gas diffusion layer. At least the anode inner catalyst layer contains a reversal tolerant catalyst and a hydrophilic additive. The content of the hydrophilic additive in the anode inner catalyst layer is not less than that of the anode outer
(Continued)

catalyst layer, or the water retention capability of the anode inner catalyst layer is not less than that of the anode outer catalyst layer.

15 Claims, 2 Drawing Sheets

(58) Field of Classification Search
USPC .......................................................... 429/483
See application file for complete search history.

(56) References Cited

U.S. PATENT DOCUMENTS

| | | | |
|---|---|---|---|
| 2010/0209807 A1* | 8/2010 | Shintani | H01M 8/1004 429/483 |
| 2020/0358118 A1* | 11/2020 | Min | H01M 4/8663 |
| 2021/0143461 A1* | 5/2021 | Kim | H01M 4/8663 |

FOREIGN PATENT DOCUMENTS

| | | | | | |
|---|---|---|---|---|---|
| CN | 107658485 | A | * | 2/2018 | .......... H01M 4/8663 |
| CN | 109075362 | A | | 12/2018 | |
| CN | 110870118 | A | | 3/2020 | |
| CN | 111063924 | A | | 4/2020 | |
| CN | 109075362 | B | | 7/2021 | |
| CN | 114566653 | A | * | 5/2022 | .......... H01M 4/8605 |
| JP | 2008027647 | A | | 2/2008 | |
| KR | 20190036809 | A | * | 4/2019 | .......... H01M 4/8663 |
| WO | WO 2016108255 | A1 | | 7/2016 | |

OTHER PUBLICATIONS

CN 114566653 A machine translation (Year: 2022).*
CN 101702439 A machine translation (Year: 2010).*
CN 107658485 A mach. trans. (Year: 2018).*

* cited by examiner

ANODE CATALYST LAYER WITH HIGH REVERSAL TOLERANT CAPABILITY FOR MEMBRANE ELECTRODE ASSEMBLIES AND FUEL CELLS

CROSS REFERENCE TO RELATED APPLICATIONS

The present application is a continuation of International Application No. PCT/CN2021/099554, filed on Jun. 11, 2021, which claims priority from Chinese Patent Application No. 202110506098.8 filed on May 10, 2021, all of which are hereby incorporated herein by reference.

TECHNICAL FIELD

The present disclosure relates to the technical field of fuel cells, more specifically, relates to an anode catalyst layer with high reversal tolerant capability, preparation thereof and applications in membrane electrode assemblies and fuel cells, particularly relates to an anode catalyst layer with high reversal tolerant capability by increasing water retention in the anode catalyst layer, and membrane electrode assemblies and fuel cells using thereof.

BACKGROUND

When a fuel cell starts up or shuts down, or rapidly changes load, impurities block a gas flow channel, or anode flooding and the like occur, hydrogen supply on anode side will be insufficient, which causes that a normal hydrogen oxidation reaction cannot proceed, an anode potential is accordingly gradually higher than a cathode potential, resulting in cell reversal. After the occurrence of cell reversal, carbon support of catalyst will react with water (see formula I, formula II) to produce [$H^+$].

$$C+H_2O=CO+2H^++2e \quad (I)$$

$$C+2H_2O=CO_2+4H^++4e \quad (II)$$

The reaction of carbon corrosion is irreversible, once it occurs, it will cause collapse of anode catalyst layer, changing structure of catalyst layer, loss of platinum catalyst in the catalyst layer, even corrosion of gas diffusion layer (GDL) and the like, which will seriously reduce performance and lifespan of membrane electrode assemblies (MEA) and fuel cells. Therefore, in order to prevent MEA from cell reversal, an oxygen evolution reagent is used as reversal tolerant catalyst in the anode catalyst layer, which can reduce water electrolysis potential and promote the electrolysis reaction of water to release oxygen (formula III) when cell reversal occurs, thereby inhibiting the reaction of water and carbon, and protecting the structure of the anode catalyst layer.

$$2H_2O=O_2+4H^++4e \quad (III)$$

Disclosed in CN111082078A is a method for preparing a membrane electrode assembly with high performance and high reversal tolerant catalyst layer. An anode slurry is prepared by a catalyst, a reversal tolerant catalyst, an appropriate amount of Nafion solution and a dispersant. The slurry is sprayed on the anode side of a proton exchange membrane. The disclosed catalyst is a conventional platinum-carbon catalyst, or a graphitized platinum-carbon catalyst. The reversal tolerant catalyst is at least one or a combination of Ru, Ir, Co, Ni, Ta, Re, Sn, Sb or an oxide thereof. The disclosure takes advantage of the inherent attributes of a reversal tolerant catalyst to make the membrane electrode assembly with certain reversal tolerant capability. However, in practical application, it is found that the improvement on reversal tolerant capability of the fuel cell by adding the reversal tolerant catalyst alone is very limited. In the aforementioned disclosure, although a large amount of the reversal tolerant catalyst is added, the reversal tolerant capability is still not sufficient, which also results in high cost of the membrane electrode assembly.

It is thus desired to provide an anode catalyst layer, a membrane electrode assembly and a fuel cell with high reversal tolerant capability, which improve cell reversal tolerant capability by anode catalyst layer designing.

SUMMARY

The present disclosure provides an anode catalyst layer with high reversal tolerant capacity which can overcome the aforesaid drawbacks of the existing art, such as insufficient reversal tolerant capability, even though quantity of reversal tolerant catalyst is added.

In one aspect, an anode catalyst layer with high reversal tolerant capability is provided, which includes an anode inner catalyst layer close to a proton exchange membrane and an anode outer catalyst layer close to a gas diffusion layer. At least the anode inner catalyst layer contains a reversal tolerant catalyst and a hydrophilic additive. The content of the hydrophilic additive in the anode inner catalyst layer is not less than that of the anode outer catalyst layer, or the water retention capability of the anode inner catalyst layer is not less than that of the anode outer catalyst layer.

In the present disclosure, a multi-layer structure of the anode catalyst layer is designed, and a water-retaining chemical environment is constructed in the layer close to the proton exchange membrane to promote electrolysis of water when a membrane electrode assembly and a fuel cell are in cell reversal, thereby protecting carbon support in the catalyst layer against corrosion, and improving the service life of the membrane electrode assembly and the fuel cell. With the distribution design of the chemical environment and the reversal tolerant catalyst according to the present disclosure, the reversal tolerant capability of the membrane electrode assembly and the fuel cell are significantly improved compared with a usual anode catalyst layer design with same content of the reversal tolerant catalyst in the MEA.

As a preferable embodiment, only the anode inner catalyst layer contains the hydrophilic additive.

The hydrophilic additive particularly includes one or more of molecular sieves, nanoporous superabsorbent gel or superporous hydrogel microparticles, hydrophilic oxides or hydroxides/sulfonates thereof, and surfactants containing hydrophilic groups.

More preferably, the molecular sieve includes one or more of ZSM-5, 3A, 4A, 5A, 13X or a derivative molecular sieve thereof. The nanoporous superabsorbent gel or superporous hydrogel microparticles includes one or more of an acrylic polymer, an acrylamide polymer or polyvinyl alcohol. The hydrophilic oxides and the hydroxides/sulfonates thereof include one or more of zirconia, ceria, manganese oxide, silicon oxide, lanthana, titania, tantalum oxide, niobium oxide, vanadium oxide, alumina, cadmium oxide, cobalt oxide or hydroxides thereof, or other oxides/hydroxides with good hydrophilicity, or graphite oxide, graphene oxide, sulfonated graphite, and sulfonated graphene. The surfactant containing the hydrophilic groups includes one or more of an alkylarylsulfonic acid, a perfluoroalkylarylsulfonic acid, an alkylsulfonic acid, a perfluoroalkylsulfonic acid or polyoxyethylene.

As a preferable embodiment, the content of the reversal tolerant catalyst in the anode inner catalyst layer is not less than that in the anode outer catalyst layer.

Particularly, the reversal tolerant catalyst is a catalyst having the capacity to electrolyze water, such as $IrO_x$, $IrRuO_x$, $RuO_x$, $PtIrO_x$, $PtRuO_x$, $PtIrRuO_x$, Ir, Ru, Co, Ni, Ta, Re, Sn, Sb or their compounds, etc.

The thickness of the anode inner catalyst layer is 10%-80% of the thickness of the anode catalyst layer.

In addition to the reversal tolerant catalyst and the hydrophilic additive, both the anode inner catalyst layer and the anode outer catalyst layer contain an electrode catalyst and a sulfonic acid resin. That is, the anode inner catalyst layer at least includes the electrode catalyst, the hydrophilic additive, the sulfonic acid resin and the reversal tolerant catalyst, and the anode outer catalyst layer at least includes the electrode catalyst and the sulfonic acid resin. The electrode catalyst includes one or more of noble metal or its alloy catalyst, non-noble metal or its alloy catalyst, and the noble metal or its alloy catalyst includes Pt/C, PtIr/C, PtRu/C, PtAu/C, PtM/C (M=Fe, Co, Mn, Cu, Ni, Cr, Ag, Mo, etc.), and the non-noble metal or its alloy catalyst includes Fe—N—C, Co—N—C, Mo—N—C, Co—Ta—C, Ni—Ta—C, Mo—Ta—C WC—Co, WC—Ni, WC—Fe, WC—Mo, etc. The sulfonic acid resin includes one or more of a perfluorosulfonic acid resin, a semi-fluorosulfonic acid resin and a non-fluorosulfonic acid resin.

In addition, the anode catalyst layer of the present disclosure includes but is not limited to a two-layers structure composed of the above-mentioned anode inner catalyst layer and the anode outer catalyst layer, and more layers can be designed between the anode inner catalyst layer and the anode outer catalyst layer to form a multi-layers structure.

In a second aspect, taking an anode catalyst layer of the two-layers structure as an example, a preparation process (construction method) of the anode catalyst layer is provided according to the present disclosure, which includes but is not limited to two-steps direct coating, two-steps decal transfer, one-step direct coating followed by one-step decal transfer (firstly performing direct coating to form an anode inner catalyst layer, and then performing decal transfer to form an anode outer catalyst layer), one-step decal transfer and one-step direct coating (firstly performing decal transfer to form an anode inner catalyst layer, and then performing direct coating to form an anode outer catalyst layer). The two-steps direct coating includes but is not limited to: firstly, directly coating on a proton exchange membrane to form the anode inner catalyst layer, and then directly coating on the anode inner catalyst layer with the anode outer catalyst layer, or directly coating on the proton exchange membrane to form the anode inner catalyst layer, and then directly coating on the surface of a gas diffusion layer with the anode outer catalytic layer, and then hot-press them together.

As a preferred embodiment, the present disclosure adopts a two-steps direct coating process, i.e. a process for preparing the above-mentioned anode catalyst layer comprises the following steps:

S1. coating on one side of a proton exchange membrane with an anode inner catalyst layer slurry to form the anode inner catalyst layer; and S2. coating on the anode inner catalyst layer formed in step S1 with an anode outer catalyst layer slurry to form the anode outer catalyst layer, namely, obtaining the anode catalyst layer.

In the above-mentioned preparation process, methods of coating include, but are not limited to, spray coating, sputtering, blade coating, slot die coating, and the like.

As a preferred embodiment, in step S2, the anode inner catalyst layer is formed on one side of the proton exchange membrane to which a cathode catalyst layer is attached on the other side.

In a third aspect, a membrane electrode assembly (MEA) with high reversal tolerant capability is further provided, which includes at least a cathode catalyst layer, a proton exchange membrane and the above-mentioned anode catalyst layer. The cathode catalyst layer is attached to one side of the proton exchange membrane, and an anode inner catalyst layer of the anode catalyst layer is attached to the other side of the proton exchange membrane.

Further, the membrane electrode assembly further includes a gas diffusion layer attached to a side of the cathode catalyst layer deviating from the proton exchange membrane, and/or attached to a side of the anode outer catalytic layer deviating from the anode inner catalyst layer.

In a fourth aspect, a fuel cell with high reversal tolerant capability is further provided, which consists of a stack by assembling the above-mentioned membrane electrode assembly. The fuel cell is a hydrogen fuel cell, a methanol fuel cell or an ethanol fuel cell.

According to the present disclosure, the chemical environment promoting water electrolysis is constructed on an inner side of the anode catalyst layer which is firstly affected when the membrane electrode assembly goes towards cell reversal, so as to improve the reversal tolerant capability of the membrane electrode assembly, protect the carbon support in the catalyst layer against corrosion, and prolong the service life of the membrane electrode assembly and the fuel cell.

The optimized design of the anode catalyst layer according to the present disclosure can prevent the flooding and blocked gas transport from occurring in the anode catalyst layer of the membrane electrode assembly, and good performance is also maintained under low temperature and high humidity conditions.

The amount of the reversal tolerant catalyst used in the anode outer catalyst layer is reduced according to the present disclosure, thereby reducing the cost of the membrane electrode assembly.

DETAILED DESCRIPTION

Figure 1:
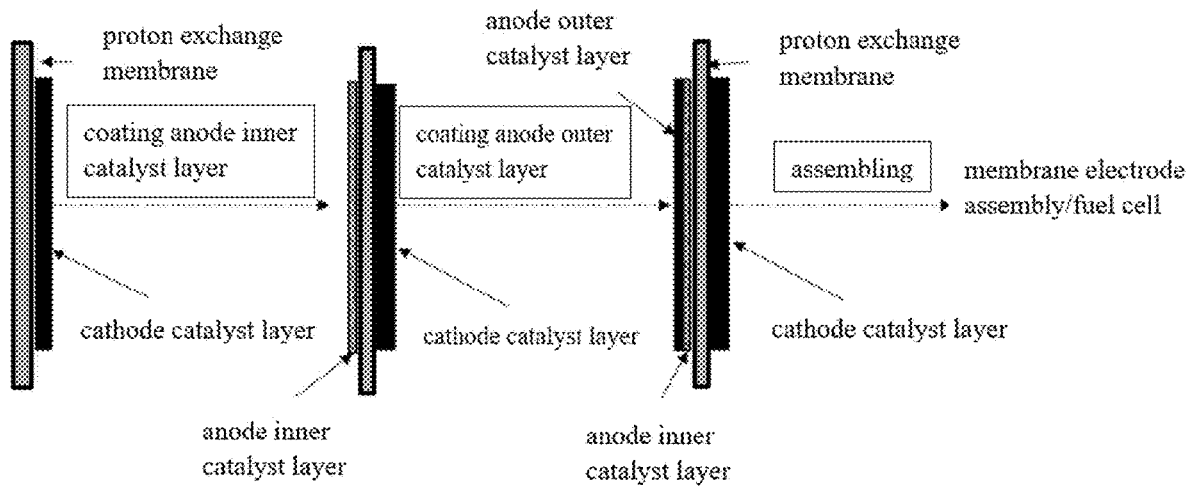
FIG. 1 is a preparation flow chart of an anode catalyst layer, a membrane electrode assembly and a fuel cell with high reversal tolerant capability according to the present disclosure.

The present disclosure is achieved by conducting studies based on the finding that, in the presence of a reversal tolerant catalyst, water content of an anode catalyst layer can affect the water electrolysis capability when cell reversal occurs, and high water content or water retention capability of the anode catalyst layer is beneficial to the improvement of the reversal tolerant capability of a fuel cell. Although an existing art provides solutions to improve the water retention capability of a catalyst layer, it aims to improve the proton transport capability of the catalyst layer through the water retention property of the catalyst layer, that is, the capability of [H⁺] transported from the anode catalyst layer to a cathode catalyst layer through a proton exchange membrane, which fails to benefit improvement of the reversal tolerant capability. Moreover, the existing art for improving the water retention capability of the catalyst layer generally have the problems of not only failing to improve the reversal tolerant capability of the fuel cell, but also causing the pore of the whole anode catalyst layer flooded due to high overall water content of its anode catalyst layer, which prevents the transport of reaction gas in the catalyst layer, thereby reducing the performance of catalyst layer, and deepening the cell reversal of a membrane electrode assembly. Especially, when the membrane electrode assembly restarts after stopping for a period of time, the entire membrane electrode assembly will be under conditions of low temperature and high humidity, as the entire anode catalyst layer contains water-retention materials, which results in high water absorption, and pore of the catalyst layer being blocked by water, and the reaction gas being not likely to enter the catalyst layer.

The present disclosure thus provides an anode catalyst layer with high reversal tolerant capability, which includes an anode inner catalyst layer close to a proton exchange membrane and an anode outer catalyst layer close to a gas diffusion layer. At least the anode inner catalyst layer contains a reversal tolerant catalyst and a hydrophilic additive, and the content of the hydrophilic additive in the anode inner catalyst layer is not less than that in the anode outer catalyst layer, or the water retention capability of the anode inner catalyst layer is not less than that in the anode outer catalyst layer. [H⁺] is transported through the anode catalyst layer, the proton exchange membrane (PEM) and the cathode catalyst layer in sequence, the inner side of the anode catalyst layer close to the proton exchange membrane is thus firstly affected when cell reversal occurs. Therefore, the present disclosure ensures the water retention capability in the inner side of the anode catalyst layer by structural design of the anode catalyst layer, which can not only effectively prevent from deepening cell reversal of the fuel cell caused by an excessive water content, but also greatly improve the reversal tolerant capability of the fuel cell.

According to at least one embodiment, only the anode inner catalyst layer contains a hydrophilic additive. In the present embodiment, the anode inner catalyst layer is added with the hydrophilic additive and high-content reversal tolerant catalyst, so that when the cell reversal occurs, the inner side of the anode catalyst layer has high reversal tolerant capability, and when a membrane electrode assembly goes toward cell reversal, a reaction of water electrolysis occurs in time to protect the carbon support against corrosion. Moreover, when the anode inner catalyst layer contains the hydrophilic additives, while the anode outer catalyst layer doesn't have the hydrophilic additive, outer side gas thus can enter the catalytic layer, thereby avoiding cell reversal caused by blocked gas transport.

According to at least one embodiment, the hydrophilic additive includes one or more of molecular sieves, nanoporous superabsorbent gel or superporous hydrogel microparticles, hydrophilic oxides or hydroxides/sulfonates thereof, and surfactants containing hydrophilic groups. Particularly, the molecular sieve includes one or more of ZSM-5, 3A, 4A, 5A, 13X or a derived molecular sieve thereof. The nanoporous superabsorbent gel or superporous hydrogel microparticles includes one or more of an acrylic polymer, an acrylamide polymer or polyvinyl alcohol. The hydrophilic oxides and the hydroxides/sulfonates thereof include one or more of zirconia, ceria, manganese oxide, silicon oxide, lanthana, titania, tantalum oxide, niobium oxide, vanadium oxide, alumina, cadmium oxide, cobalt oxide or hydroxides thereof, or other oxides/hydroxides with good hydrophilicity, or graphite oxide, graphene oxide, sulfonated graphite, sulfonated graphene. The surfactant containing the hydrophilic groups includes one or more of an alkylarylsulfonic acid, a perfluoroalkylarylsulfonic acid, an alkylsulfonic acid, a perfluoroalkylsulfonic acid or polyoxyethylene.

According to a preferable embodiment, the content of the reversal tolerant catalyst in the anode inner catalyst layer is not less than that of the anode outer catalyst layer, that is, the anode outer catalyst layer contains less reversal tolerant catalyst than the anode inner catalyst layer or contains no reversal tolerant catalyst. With further studies, it was found that maintaining a higher content of the reversal tolerant catalyst in the inner side of the anode catalyst layer than that in the outer side catalyst layer helps to improve the utilization rate of the reversal tolerant catalyst.

In one embodiment, the reversal tolerant catalyst is a catalyst having capacity to electrolyze water, such as $IrO_x$, $IrRuO_x$, $RuO_x$, $PtIrO_x$, $PtRuO_x$, $PtIrRuO_x$, Ir, Ru, Co, Ni, Ta, Re, Sn, Sb or their compounds, etc.

As a preferred embodiment, the thickness of the anode inner catalyst layer is 10%-80% of the thickness of the anode catalyst layer, that is, the thickness of the anode outer catalyst layer is 20-90% of the thickness of the anode catalyst layer.

In addition to the reversal tolerant catalyst and the hydrophilic additive, both the anode inner catalyst layer and the anode outer catalyst layer contain an electrode catalyst, including a hydrogen oxidizing catalyst, and a sulfonic acid resin. That is, the anode inner catalyst layer at least includes the electrode catalyst, the hydrophilic additive, the sulfonic acid resin and the reversal tolerant catalyst, and the anode outer catalyst layer at least includes the electrode catalyst and the sulfonic acid resin. The electrode catalyst includes one or more of noble metal or its alloy catalyst such as Pt/C, PtIr/C, PtRu/C, PtAu/C, and PtM/C (M=Fe, Co, Mn, Cu, Ni, Cr, Ag, Mo, etc.), and non-noble metal or its alloy catalyst such as Fe—N—C, Co—N—C, Mo—N—C, Co—Ta—C, Ni—Ta—C, Mo—Ta—C WC—Co, WC—Ni, WC—Fe, WC—Mo, etc. The sulfonic acid resin includes one or more of a perfluorosulfonic acid resin, a semi-fluorosulfonic acid resin and a non-fluorosulfonic acid resin.

In addition, the anode catalyst layer according to at least one embodiment includes, but is not limited to, a two-layers structure composed of the above-mentioned anode inner catalyst layer and the anode outer catalyst layer. It is conceivable that more layers can be designed between the anode inner catalyst layer and the anode outer catalyst layer to form a multi-layer structure.

Taking the anode catalyst layer of the two-layers structure as an example, a preparation process or construction method of the anode catalyst layer according to at least one embodiment includes but is not limited to two-steps direct coating, two-steps decal transfer, one-step direct coating and one-step decal transfer (firstly performing direct coating to form an anode inner catalyst layer, and then performing decal transfer to form an anode outer catalyst layer), one-step decal transfer and one-step direct coating (firstly performing decal transfer to form an anode inner catalyst layer, and then performing direct coating to form an anode outer catalyst layer). The two-steps direct coating includes but is not limited to firstly directly coating on a proton exchange membrane to form the anode inner catalyst layer, and then directly coating on the anode inner catalyst layer with the anode outer catalyst layer, or directly coating on the proton exchange membrane to form the anode inner catalyst layer, and then directly coating on the surface of a gas diffusion layer with the anode outer catalyst layer, and then hot press them together.

A process for preparing the above-mentioned anode catalyst layer is further provided according to at least one embodiment, which includes steps of preparing an anode inner catalyst layer slurry, coating an anode inner catalyst layer, preparing an anode outer catalyst layer slurry, and coating of an anode outer catalyst layer.

In the step of preparing an anode inner catalyst layer slurry, certain content of a hydrogen oxidation catalyst (usually a Pt/C catalyst), a reversal tolerant catalyst, water, perfluorosulfonic acid resin dispersion, low-boiling point alcohol, and a hydrophilic additive are weighed. Specifically, the solid content of the perfluorosulfonic acid resin is 20%-100% of that of the hydrogen oxidation catalyst, the amount of the reversal tolerant catalyst is 5%-100% of that of the hydrogen oxidation catalyst, the amount of water is 5-20 times that of the hydrogen oxidation catalyst, the amount of the low-boiling point alcohol is 0.1-2 times that of water, and the content of the hydrophilic additive is 0.1-2.0 times that of the reversal tolerant catalyst. The weighed hydrogen oxidation catalyst is slowly added into water and stirred about 5 mins to be watered and uniformly dispersed. Then the reversal tolerant catalyst, the perfluorosulfonic acid resin, the low-boiling point alcohol and the hydrophilic additive are sequentially added and stirred about 2 mins after each material is added. The slurry is further crushed and dispersed by a slurry dispersion device to preliminarily prepare the anode inner layer catalyst slurry, and then defoamed to obtain the anode inner catalyst layer slurry being able to be coated.

In the step of coating an anode inner catalyst layer, the anode inner catalyst layer slurry is coated on a side of a proton exchange membrane, which has been coated with a cathode catalyst layer on the other side thereof, in a slot die coating method and dried for use.

In the step of preparing an anode outer catalyst layer slurry. Certain content of a hydrogen oxidation catalyst (usually a Pt/C catalyst), a reversal tolerant catalyst, water, perfluorosulfonic acid resin dispersion, and low-boiling point alcohol are weighed. Specifically, the solid content of the perfluorosulfonic acid resin is 20%-100% of that of the hydrogen oxidation catalyst, the amount of the reversal tolerant catalyst is 5%-100% of that of the hydrogen oxidation catalyst, the amount of water is 5-20 times that of the hydrogen oxidation catalyst, and the amount of the low-boiling point alcohol is 0.1-2 times that of water. The weighed hydrogen oxidation catalyst is slowly added into water and stirred about 5 mins to be watered and uniformly dispersed. Then the reversal tolerant catalyst, the perfluorosulfonic acid resin, and the low-boiling point alcohol are sequentially added and stirred about 2 mins after each material is added. The slurry is further crushed and dispersed by a slurry dispersion device to preliminarily prepare the anode outer catalyst layer slurry, and then defoamed to obtain the anode outer catalyst layer slurry being able to be coated.

In the step of coating of an anode outer catalyst layer, the obtained anode outer catalytic layer slurry is coated on the prepared anode inner catalyst layer in a mode of slot die coating to form the anode outer catalyst layer, thereby obtaining the anode catalyst layer in an anode with a two-layers structure. Alternatively, the anode outer catalyst layer slurry can be coated on PTFE or other types of release films, and then hot pressed and transferred onto the prepared anode inner catalyst layer, obtaining an anode catalyst layer in layered design.

In the above-mentioned preparation process, the method of coating is not limited to slot die coating, but can also be spray coating, sputtering, blade coating, etc.

On this basis, a membrane electrode assembly and a fuel cell are further provided applying the above-mentioned anode catalyst layer.

A membrane electrode assembly (MEA) with high reversal tolerant capability according to one embodiment includes a cathode catalyst layer, a proton exchange membrane and the above-mentioned anode catalyst layer. The cathode catalyst layer is attached to one side of the proton exchange membrane, and an anode inner catalyst layer of the anode catalyst layer is attached to the other side of the proton exchange membrane away from the cathode catalyst layer. Usually, the membrane electrode assembly further includes a gas diffusion layer attached to a side of the cathode catalyst layer away from the proton exchange membrane and attached to a side of the anode outer catalyst layer away from the anode inner catalytic layer.

A fuel cell with high reversal tolerant capability according to one embodiment is a stack formed by assembling the above-mentioned membrane electrode assembly. The fuel cell is a hydrogen fuel cell, a methanol fuel cell or an ethanol fuel cell.

In order for those skilled in the art to better understand, it is further described in details below with reference to specific examples, and a comparative example is designed to observe whether addition of the hydrophilic additive to the anode catalyst layer and distribution of the reversal tolerant catalyst in the anode catalyst layer have influence on the reversal tolerant capability, and whether the layered (different water retention capacity) design of the anode catalyst layer influence on cell reversal.

Example 1

In the step of preparing an anode inner catalyst layer slurry, 4.7 g of 30 wt % Pt/C catalyst Tec10F30e produced by Tanaka Kikinzoku (TKK), 0.4 g of self-made reversal tolerant catalyst $IrO_x$, 16.5 g of 20 wt % perfluorosulfonic acid resin dispersion, 6.2 g of ethanol, 0.8 g of sulfonated graphene and 39.0 g of ultrapure water are weighed. The Pt/C catalyst is slowly added to the water in a stirring state and stirred for 5 mins, then the reversal tolerant catalyst is added and stirred for 2 mins, the perfluorosulfonic acid resin dispersion is then added and stirred for 2 mins, and the sulfonated graphene and the ethanol are then added in sequence and continuously stirred for 2 mins to complete pre-dispersion of the slurry. The slurry is further dispersed by a Beads mill disperser with 3000 rpm of rotation speed, and 30 mins of dispersion time. The dispersed catalyst slurry is then collected for defoaming treatment to obtain the final anode inner catalyst layer slurry.

In step of coating an anode inner catalyst layer, the anode inner catalyst layer slurry is coated on a side of a proton exchange membrane, which has been provided with a cathode catalyst layer on the other side thereof, in a slot die coating method and dried to form the anode inner catalyst layer. The loading of Pt in the anode inner catalyst layer is about 50.0 μg/cm², the loading of Ir is about 15 μg/cm², and the thickness of the anode inner catalyst layer is about 4.5 μm.

In step of preparing an anode outer catalyst layer slurry, 4.7 g of 30 wt % Pt/C catalyst Tec10F30e produced by Tanaka Kikinzoku (TKK), 0.2 g of self-made reversal tolerant catalyst $IrO_x$, 16.5 g of 20 wt % perfluorosulfonic acid resin dispersion, 6.2 g of ethanol, and 39.0 g of ultrapure water are weighed. The Pt/C catalyst is slowly added to the water in a stirring state and stirred for 5 mins, then the reversal tolerant catalyst, the perfluorosulfonic acid resin dispersion, and the ethanol are sequentially added and respectfully stirred for 2 mins to obtain pre-dispersion of the slurry. The slurry is further crushed and dispersed by a Beads mill disperser with 3000 rpm of rotation speed and 30 mins of dispersion time. The dispersed catalyst slurry is then collected for defoaming treatment to obtain the final anode outer catalyst layer slurry.

In step of coating an anode outer catalyst layer, the prepared anode outer catalyst layer slurry is coated on the anode inner catalyst layer which has been coated on the proton exchange membrane in a slot die coating method and dried to form the anode catalyst layer of a two-layered structure and a catalyst coated membrane (CCM). The loading of Pt in the anode outer catalyst layer is about 50.0 μg/cm², the loading of Ir is about 7.5 μg/cm², and the thickness is about 4.5 μm.

In step of preparation of MEA stack, firstly a frame material and a gas diffusion layer are assembled with CCM in turn to form a membrane electrode assembly, and then the membrane electrode assembly is assembled with a bipolar plate and other components to form a stack.

Example 2

In the step of preparing an anode inner catalyst layer slurry, 4.7 g of 30 wt % Pt/C catalyst Tec10F30e produced by Tanaka Kikinzoku (TKK), 0.4 g of self-made reversal tolerant catalyst $IrO_x$, 16.5 g of 20 wt % perfluorosulfonic acid resin dispersion, 6.2 g of ethanol, 0.8 g of sulfonated graphene and 39.0 g of ultrapure water are weighed. The Pt/C catalyst is slowly added to the water in a stirring state and stirred for 5 mins, then the reversal tolerant catalyst is added and stirred for 2 mins, the perfluorosulfonic acid resin dispersion is then added and stirred for 2 mins, and the sulfonated graphene and the ethanol are then added in sequence and continuously stirred for 2 mins to complete pre-dispersion of the slurry. The slurry is further dispersed by a Beads mill disperser with 3000 rpm of rotation speed and 30 mins of dispersion time. The dispersed catalyst slurry is then collected for defoaming treatment to obtain the final anode inner catalyst layer slurry.

In step of coating an anode inner catalyst layer, the anode inner catalyst layer slurry is coated on a side of a proton exchange membrane, which has been provided with a cathode catalyst layer on the other side thereof, in a slot die coating method and dried to form the anode inner catalyst layer. The loading of Pt in the anode inner catalyst layer is about 50.0 μg/cm², the loading of Ir is about 15.0 μg/cm², and the thickness of the anode inner catalyst layer is about 4.5 μm.

In step of preparing an anode outer catalyst layer slurry, 4.7 g of 30 wt % Pt/C catalyst Tec10F30e produced by Tanaka Kikinzoku (TKK), 16.2 g of 20 wt % perfluorosulfonic acid resin dispersion, 6.2 g of ethanol, and 39.0 g of ultrapure water are weighed. The Pt/C catalyst is slowly added to the water in a stirring state and stirred for 5 mins, then the reversal tolerant catalyst, the perfluorosulfonic acid resin dispersion and the ethanol are sequentially added and respectfully stirred for 2 mins to complete pre-dispersion of the slurry. The slurry is further dispersed by a Beads mill disperser with 3000 rpm of rotation speed and 30 mins of dispersion time. The dispersed catalyst slurry is then collected for defoaming treatment to obtain the final anode outer catalyst layer slurry.

In step of coating an anode outer catalyst layer, the prepared anode outer catalyst layer slurry is coated on the anode inner catalyst layer which has been coated on the proton exchange membrane in a slot die coating method and dried to form the anode catalyst layer of a two-layered structure and a CCM. The loading of Pt in the anode outer catalyst layer is about 50.0 μg/cm², the thickness is about 4.5 μm, and no reversal tolerant catalyst exists.

In step of preparation of MEA stack, a frame material and a gas diffusion layer with CCM assembled in turn to form a membrane electrode assembly, and then the membrane electrode assembly is assembled with a bipolar plate and other components to form a stack.

Comparative Example 1

In step of preparing an anode catalyst layer slurry, 4.7 g of 30 wt % Pt/C catalyst Tec10F30e produced by Tanaka Kikinzoku (TKK), 0.37 g of self-made reversal tolerant catalyst $IrO_x$, 16.5 g of 20 wt % perfluorosulfonic acid resin dispersion, 6.2 g of ethanol, and 39.0 g of ultrapure water are weighed. The Pt/C catalyst is slowly added to the water in a stirring state and stirred for 5 mins, then the reversal tolerant catalyst is added and stirred for 2 mins, the perfluorosulfonic acid resin dispersion is then added and stirred for 2 mins, and the ethanol is then added and continuously stirred for 2 mins to complete pre-dispersion of the slurry. The slurry is dispersed by a Beads mill disperser with 3000 rpm of rotation speed, and 30 mins of dispersion time. The dispersed catalyst slurry is then collected for defoaming treatment to obtain the final anode catalyst layer slurry.

In step of coating an anode catalyst layer, the anode catalyst layer slurry is coated on a side of a proton exchange membrane, which has been coated with a cathode catalyst layer on the other side thereof, in a slot die coating method and dried to form the anode catalyst layer. The loading of Pt in the anode catalyst layer is about 100.0 μg/cm², the loading of Ir is 22.5 μg/cm², and the thickness of a coating is about 9.0 μm.

In step of preparation of MEA stack, a frame material and a gas diffusion layer are assembled with CCM in turn to form a membrane electrode assembly, and then the membrane electrode assembly is assembled with a bipolar plate and other components to form a stack.

Comparative Example 2

The slurry formulation of this comparative example is the same as that of Example 1, except that there are no reversal tolerant catalyst in the anode catalyst layer. An anode catalyst slurry containing sulfonated graphene is coated on a side of a proton membrane, which has been provided with a cathode catalyst layer on the other side thereof, in a slot die coating method and dried to form a catalyst layer with hydrophilic substances on the entire anode. The loading of Pt in the catalyst layer is about 100.0 μg/cm² and the coating thickness is about 9.0 μm.

Figure 2:
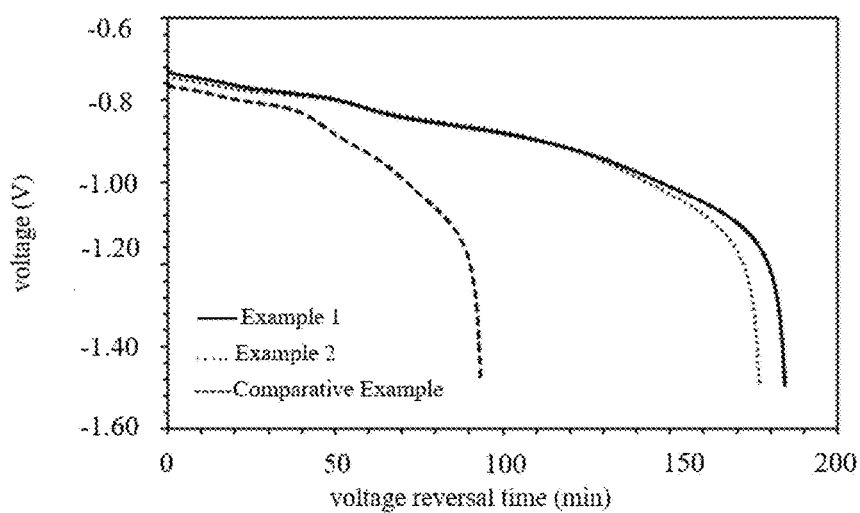
FIG. 2 is reversal tolerant capability test result of Examples 1-2 and Comparative Example 1.

In order to observe whether addition of a hydrophilic additive to an anode catalyst layer and distribution of a reversal tolerant catalyst in the anode catalyst layer have influence on the reversal tolerant capability, the voltage reversal time of Examples 1 to 2 and Comparative Example 1 are tested. The test results are as shown in FIG. 2. From the comparison between Example 1 and Comparative Example 1, it can be seen that under the condition of the same loading of the reversal tolerant catalyst, the voltage reversal time of Example 1 is increased by 90 mins compared with the comparative example 1. From the comparison between Example 2 and Comparative Example 1, it can be seen that even though the content of the reversal tolerant catalyst in Example 2 is less than that of the comparative example, the voltage reversal time of Example 2 is also much longer than that of Comparative Example 1. At the same time, from the comparison between Example 1 and Example 2, it can be seen that the reversal tolerant catalyst of the anode outer catalyst layer plays a small role, therefore, maintaining a higher content of the reversal tolerant catalyst in the inner side of the anode catalyst layer than in the outer side catalyst layer helps to improve the utilization rate of the reversal tolerant catalyst.

Figure 3:
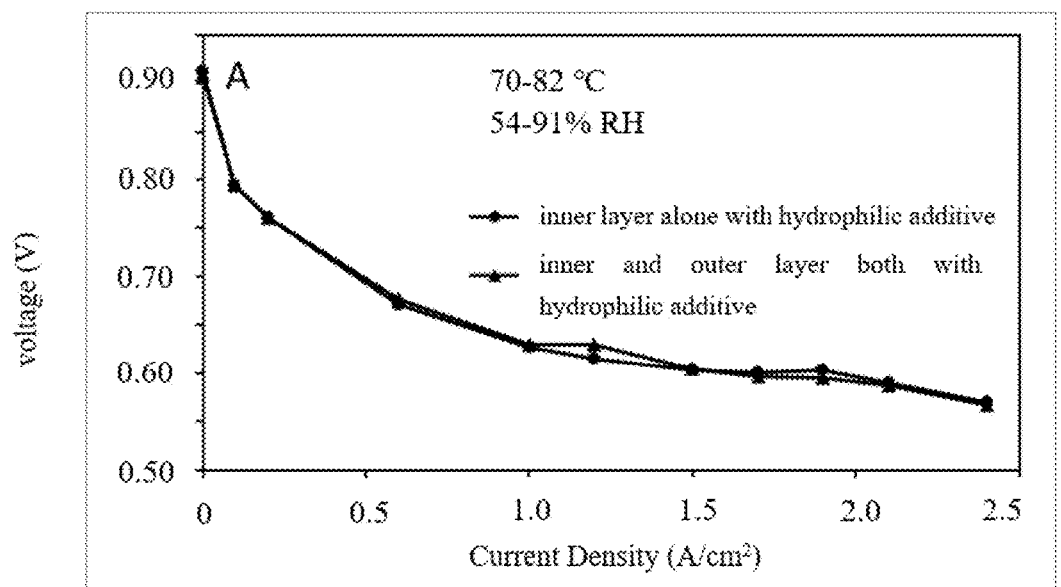
FIG. 3 is a performance test result of Example 1 and Comparative Example 2 under conditions of 70-82° C. and 54-91% RH.
Figure 4:
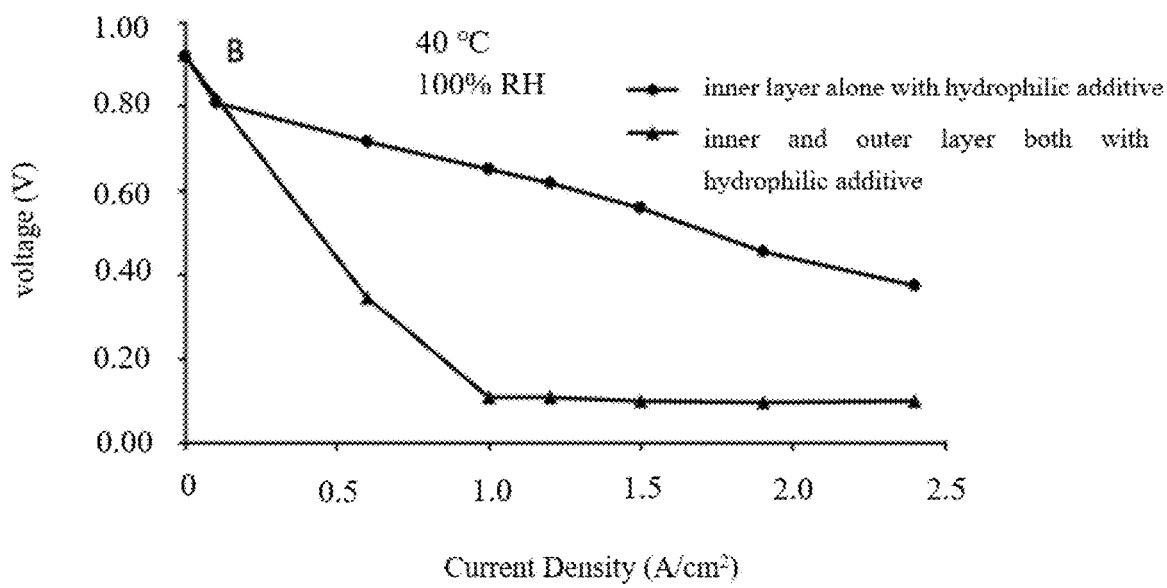
FIG. 4 is a performance test result of Example 1 and Comparative Example 2 under conditions of 40° C. and 100% RH.

In order to observe the influence of the layered (different water retention capacity) design of the anode catalyst layer on the cell reversal, the performance of Example 1 and Comparative Example 2 are tested, and the test results are shown in FIG. 3 and FIG. 4 respectively. Compared with a layered anode catalyst layer with only the inner layer containing a hydrophilic additive (Example 1) and with both layers containing a hydrophilic additive (Comparative Example 2), there is no significant difference in the performance of the two MEAs under the condition of high temperature. While under the condition of low temperature and high humidity, the performance of a sample of Comparative Example 2 has a sharp drop in the medium and high current density, which indicates that the catalyst layer thereof is flooded.

Obviously, the above-mentioned examples of the present disclosure are only examples taken for clearly illustrating the present disclosure, and are not intended to limit the embodiment of the present disclosure. For those of ordinary skill in the art, changes or modifications in other different forms can also be made on the basis of the above illustration. There is no need and it is impossible to exhaustively list all embodiments here. Any modification, equivalent replacement, improvement, etc. made within the spirit and principle of the present disclosure shall be included within the protection scope of the claims of the present disclosure.

The invention claimed is:

1. An anode catalyst layer with high reversal tolerant capability, comprising:
    an anode inner catalyst layer between a proton exchange membrane and a gas diffusion layer; and
    an anode outer catalyst layer between the gas diffusion layer and the anode inner catalyst layer,
    wherein at least the anode inner catalyst layer contains a reversal tolerant catalyst and a hydrophilic additive, and a content of the hydrophilic additive in the anode inner catalyst layer is not less than a content of the hydrophilic additive in the anode outer catalyst layer, or a water retention capability of the anode inner catalyst layer is not less than a water retention capability of the anode outer catalyst layer, and
    wherein the hydrophilic additive includes at least one of a molecular sieve, a nanoporous superabsorbent gel or a superporous hydrogel microparticle, and a surfactant containing a hydrophilic group;
    wherein only the anode inner catalyst layer contains the hydrophilic additive.

2. The anode catalyst layer with high reversal tolerant capability according to claim 1, wherein the molecular sieve comprises at least one of ZSM-5, 3A, 4A, 5A, 13X or a derived molecular sieve thereof.

3. The anode catalyst layer with high reversal tolerant capability according to claim 1, wherein the nanoporous superabsorbent gel or superporous hydrogel microparticle comprises at least one of an acrylic polymer, an acrylamide polymer or polyvinyl alcohol.

4. The anode catalyst layer with high reversal tolerant capability according to claim 1, wherein the surfactant containing the hydrophilic group comprises at least one of an alkylarylsulfonic acid, a perfluoroalkylarylsulfonic acid, an alkylsulfonic acid, a perfluoroalkylsulfonic acid or polyoxyethylene.

5. The anode catalyst layer with high reversal tolerant capability according to claim 1, wherein a content of the reversal tolerant catalyst in the anode inner catalyst layer is not less than a content of the reversal tolerant catalyst in the anode outer catalyst layer.

6. The anode catalyst layer with high reversal tolerant capability according to claim 5, wherein the reversal tolerant catalyst is a catalyst having capability to electrolyze water.

7. The anode catalyst layer with high reversal tolerant capability according to claim 1, wherein a thickness of the anode inner catalyst layer is 10%-80% of a thickness of the anode catalyst layer.

8. A preparation process of the anode catalyst layer with high reversal tolerant capability according to claim 1, comprising the following steps:
    S1 coating on one side of the proton exchange membrane with an anode inner catalyst layer slurry to form the anode inner catalyst layer; and
    S2 coating on the anode inner catalyst layer formed in step S1 with an anode outer catalyst layer slurry to form the anode outer catalyst layer, the anode catalyst layer being obtained.

9. The preparation process of the anode catalyst layer with high reversal tolerant capability according to claim 8, wherein preparation of the anode inner catalyst layer slurry comprises steps of:
    weighing a hydrogen oxidation catalyst, an reversal tolerant catalyst, water, perfluorosulfonic acid resin dispersion, low-boiling point alcohol, and a hydrophilic additive, in which a solid content of the perfluorosulfonic acid resin is 20%-100% of that of the hydrogen oxidation catalyst, an amount of the reversal tolerant catalyst is 5%-100% of that of the hydrogen oxidation catalyst, an amount of water is 5-20 times that of the hydrogen oxidation catalyst, an amount of the low-boiling point alcohol is 0.1-2 times that of water, and content of the hydrophilic additive is 0.1-2.0 times that of the reversal tolerant catalyst;
    adding the weighted hydrogen oxidation catalyst into the water and stirring about 5 mins to be watered and uniformly dispersed; and
    sequentially adding the weighed reversal tolerant catalyst, the weighed perfluorosulfonic acid resin, the weighed low-boiling point alcohol and the weighed hydrophilic additive into the water and stirring about 2 mins after each material is added, a slurry being obtained.

10. The preparation process of the anode catalyst layer with high reversal tolerant capacity according to claim 9, wherein preparation of the anode inner catalyst layer slurry further comprises steps of:

crushing and dispersing the slurry obtained by a slurry dispersion device to prepare a preliminary anode inner layer catalyst slurry, and then defoaming to obtain the anode inner catalyst layer slurry to be coated.

11. The preparation process of the anode catalyst layer with high reversal tolerant capability according to claim 8, wherein preparation of the anode outer catalyst layer slurry comprises steps of:
weighing a hydrogen oxidation catalyst, a reversal tolerant catalyst, water, a perfluorosulfonic acid resin dispersion, and a low-boiling point alcohol, in which a solid content of the perfluorosulfonic acid resin is 20%-100% of that of the hydrogen oxidation catalyst, an amount of the reversal tolerant catalyst is 5%-100% of that of the hydrogen oxidation catalyst, an amount of water is 5-20 times that of the hydrogen oxidation catalyst, and an amount of the low-boiling point alcohol is 0.1-2 times that of water;
adding the weighed hydrogen oxidation catalyst into the water and stirring about 5 mins to be watered and uniformly dispersed; and
sequentially adding the weighed reversal tolerant catalyst, the weighed perfluorosulfonic acid resin, and the weighed low-boiling point alcohol into the water and stirring about 2 mins after each material is added, a slurry being obtained.

12. The preparation process of the anode catalyst layer with high reversal tolerant capability according to claim 11, wherein preparation of the anode outer catalyst layer slurry further comprises steps of:
crushing and dispersing the slurry obtained by a slurry dispersion device to prepare a preliminary anode outer layer catalyst slurry, and then defoaming to obtain the anode outer catalyst layer slurry to be coated.

13. The preparation process of the anode catalyst layer with high reversal tolerant capability according to claim 8, wherein a method of coating comprises slot die coating, spray coating, sputtering, and blade coating.

14. A membrane electrode assembly with high reversal tolerant capability, comprising at least a cathode catalyst layer, a proton exchange membrane and the anode catalyst layer according to claim 1, the cathode catalyst layer being attached to one side of the proton exchange membrane, and the anode inner catalyst layer of the anode catalyst layer being attached to an opposite side of the proton exchange membrane.

15. A fuel cell with high reversal tolerant capability, wherein the fuel cell is a stack formed by assembling the membrane electrode assembly according to claim 14.

* * * * *